(No Model.) 2 Sheets—Sheet 1.

W. B. DOLSEN.
DEVICE FOR LOADING VEHICLES.

No. 383,636. Patented May 29, 1888.

WITNESSES:
W. R. Davis.
C. Sedgwick.

INVENTOR:
W. B. Dolsen
BY Munn & Co.
ATTORNEYS.

(No Model.) 2 Sheets—Sheet 2.
W. B. DOLSEN.
DEVICE FOR LOADING VEHICLES.
No. 383,636. Patented May 29, 1888.
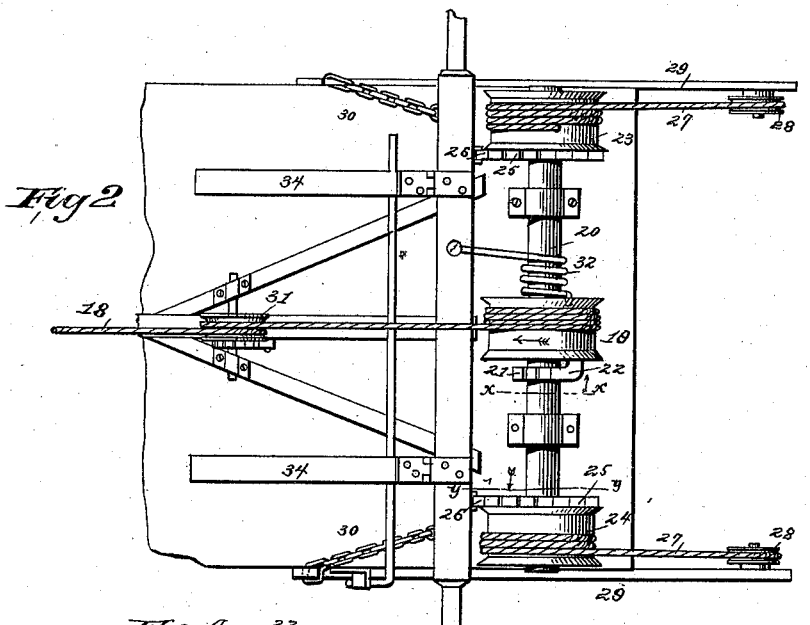
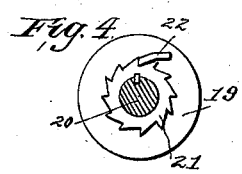
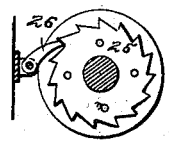
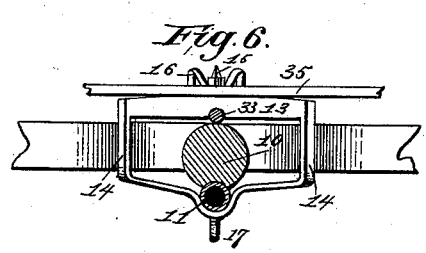
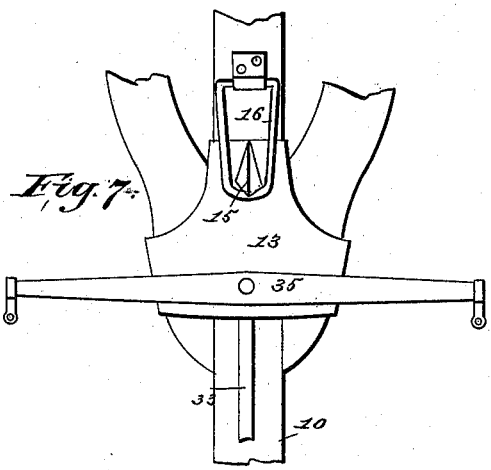
WITNESSES:
W. R. Davis.
C. Sedgwick.
INVENTOR:
W. B. Dolsen.
BY Munn & Co.
ATTORNEYS.

United States Patent Office.

WILLIAM B. DOLSEN, OF MOBERLY, MISSOURI.

DEVICE FOR LOADING VEHICLES.

SPECIFICATION forming part of Letters Patent No. 383,636, dated May 29, 1888.

Application filed May 17, 1887. Serial No. 238,471. (No model.)

*To all whom it may concern:*

Be it known that I, WILLIAM B. DOLSEN, of Moberly, in the county of Randolph and State of Missouri, have invented a new and Improved Device for Loading Vehicles, of which the following is a full, clear, and exact description.

This invention relates to an attachment for vehicles, the object of the invention being to provide for the hoisting of the material with which the vehicle is to be loaded.

Reference is to be had to the accompanying drawings, forming a part of this specification, in which similar figures of reference indicate corresponding parts in all the views.

Figure 1:
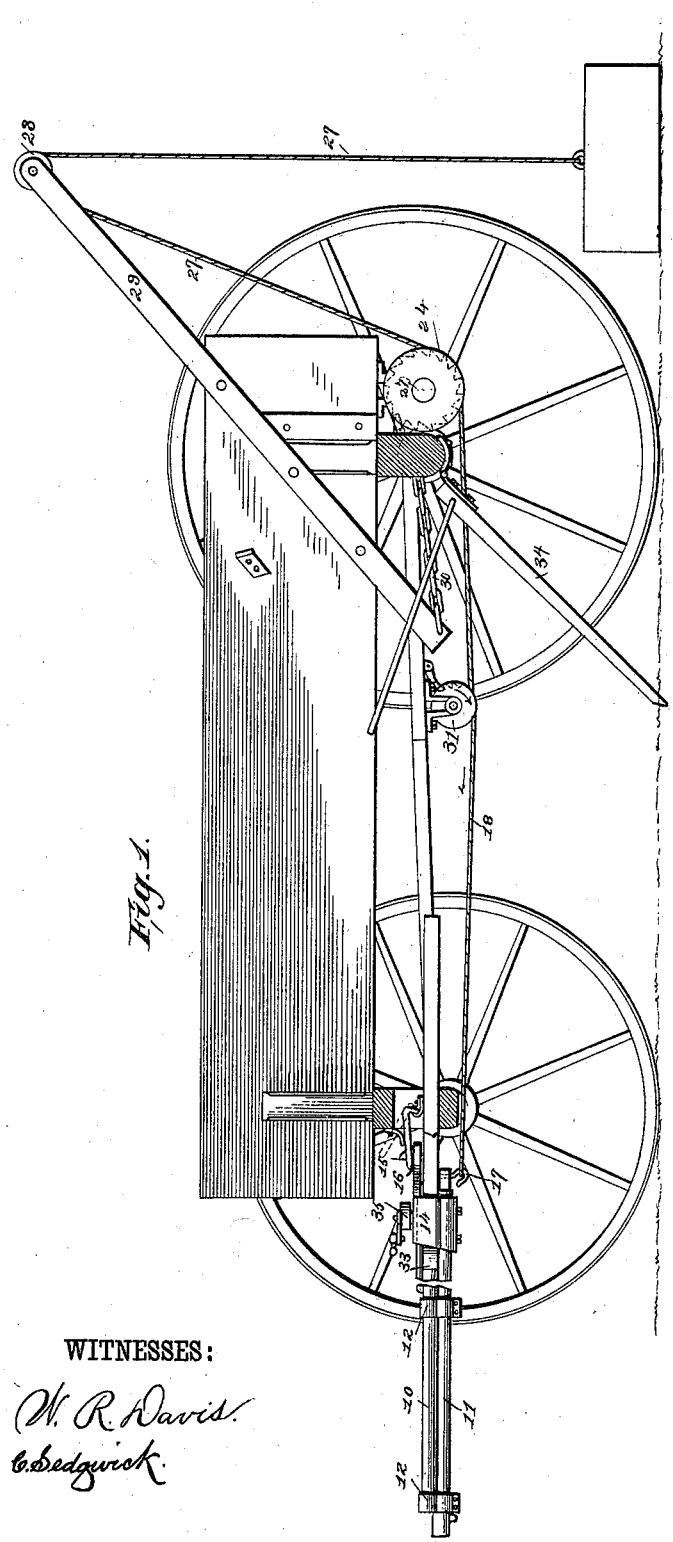
Figure 3:
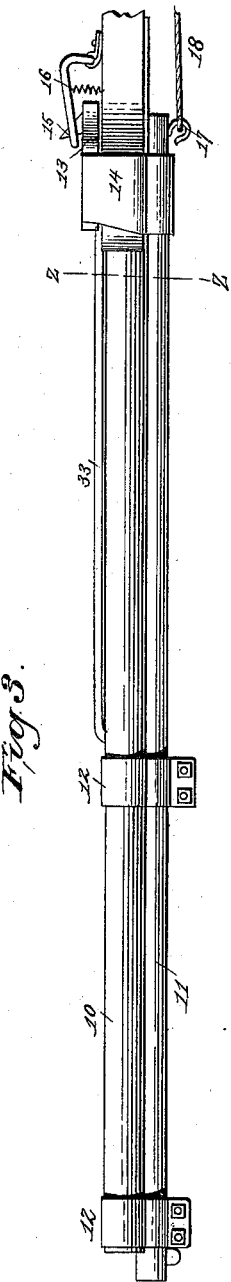

Figure 1 is a sectional elevation of a vehicle provided with my improved loading attachment, the forward axle being shown in central cross-section, while the rear axle is shown in section upon a line just within the hind left-hand wheel. Fig. 2 is an inverted plan view of the rear portion of the vehicle-body. Fig. 3 is a side view of the telescopically-united tongue which I employ in connection with my loading attachment. Fig. 4 is a sectional detail view taken upon a line corresponding with that of the line *x x* of Fig. 2. Fig. 5 is a sectional detail view taken upon a line corresponding with that of the line *y y* of Fig. 2. Fig. 6 is a sectional detail view taken upon line *z z* of Fig. 3, and Fig. 7 is a detail view of the hounds as arranged to embody my invention.

In the drawings, 10 represents the main pole or tongue of a vehicle, to the under side of which there is secured an auxiliary tongue, 11, said tongue 11 being clamped to the tongue 10 by metallic straps or bands 12, that are arranged as indicated in the drawings. The auxiliary tongue 11 carries a plate, 13, which is rigidly connected to said tongue by straps or bands 14, and this plate 13 is provided with a hook, 15, that is arranged to be engaged by a bail, 16, that is connected to the rear end of the tongue 10, or this bail could be connected to any other proper portion of the vehicle. In practice it might be found advisable to hold the bail 16 in the position in which it is shown in Fig. 3 by a spiral spring such as that shown in the figure referred to, or the spring could be arranged in any other desired way.

The tongue 11 is provided with a hook, 17, to which there is secured a hemp or wire rope, 18, which leads backward from the hook 17 to a drum, 19, that is loosely mounted on a shaft, 20, said shaft 20 being connected to the hind axle or to the under side of the vehicle-body. The shaft 20 carries a rigidly-mounted ratchet, 21, that is engaged by a pawl, 22, said pawl being connected to the side of the drum 19. To the shaft 20 there are rigidly connected two drums, 23 and 24, ratchets 25 being arranged in connection with these drums, the pawls 26 of these ratchets being fixed to any proper stationary object—as, for instance, the rear axle.

Ropes 27 are connected to the drums 23 and 24 and passed from said drums upward and about sheaves 28, that are carried by rearwardly and upwardly extending bars 29, said bars being connected to the vehicle-body and held by chains 30, which pass from the lower ends of the bars to the rear axle of the vehicle.

In passing from the hook 17 to the drum 19 the rope 18 is passed about a sheave, 31, that is mounted beneath the reach, as shown in Figs. 1 and 2, and this sheave is provided with a pawl and ratchet which permits of the free turning of the sheave in the direction of the arrow shown in connection therewith in Fig. 1, but which prevents the turning of the sheave in the opposite direction. In connection with the drum 19, I arrange a spiral spring, 32, one end of which is connected to the vehicle-axle, while the other is connected to the drum.

The doubletree 35 is connected to the plate 13. Upon the top of the tongue 10 there is a guide, 33, which enters a groove formed in the plate 13. Stay-braces 34 are hinged to the hind axle and arranged so that they may be folded down to the position in which they are shown in Fig. 1.

Such being the general construction of my device for loading vehicles, the operation is as follows: When it is desired to load the vehicle, the bail 16 is turned up from engagement with the hook 15, the braces 34 are dropped to the position in which they are shown in Fig. 1, one or both of the ropes 27 are attached to the object to be raised, and the team is started forward, drawing, as they so move forward, the rope 18 in the direction of the arrow shown in connection therewith, and consequently moving the drum 19 in the direction of its arrow. As the drum 19 so moves, its pawl 22 will engage with the ratchet 21, and the shaft 20 will be revolved, the drum and shaft at this time moving against the tension of the spring 32, and as the shaft 20 is revolved the drums 23 and 24 will be carried forward and the ropes 27 will be wound thereon, thus raising the weight secured to their ends.

When it is desired to slack off the weight and lower it into the vehicle, the pawls 26 are thrown from engagement with their ratchet-wheels and the team is backed up, all sudden falling of the weight being at this time prevented, owing to the fact that the rope 18 must slip about the sheave 31, the slack of the rope 18 being rewound upon the drum 19 by the action of the spring 32.

The apparatus above described will be found to be exceedingly useful in the loading of farm and mercantile vehicles.

Having thus fully described my invention, I claim as new and desire to secure by Letters Patent—

1. In a loading device for vehicles, the combination, with the shaft and its weight-raising drums and ropes and its turning or actuating rope, of a sheave or pulley around which is passed or coiled the latter rope, and a loose drum or pulley having a pawl-and-ratchet connection with said latter shaft, and to which is also connected the said latter rope, and the slack-take-up spring applied to said loose drum or pulley and to a fixture, substantially as set forth.

2. The combination, with a main tongue, of an auxiliary extensible tongue connected thereto, a guide carried by the main tongue, a plate carried by the auxiliary tongue, said plate being grooved to receive the guide, a hook carried by the plate, a bail carried by the main tongue, a doubletree carried by the plate, a rope connected to the auxiliary tongue and leading to a drum that is loosely mounted on a drum-shaft, said drum and drum-shaft, and hoisting-ropes connected to other drums carried by the drum-shaft, the several drums being provided with ratchets, substantially as described.

3. The combination, with an extensible tongue, substantially as described, of a drum-shaft, a drum loosely mounted thereon, a ratchet carried by the shaft, a pawl carried by the drum, a spring arranged in connection with the drum, a rope leading from the extensible tongue to the loose drum, drums fixed to the shaft, hoisting-ropes connected to the fixed drums, sheaves over which the hoisting-ropes pass, and ratchets and pawls arranged in connection with the fixed drum, substantially as described.

4. In a vehicle-loader, the combination of the following elements: a main tongue, 10, an auxiliary tongue, 11, connected thereto, a hook connected to the auxiliary tongue, a bail connected to the main tongue, a doubletree connected to the auxiliary tongue, a shaft, 20, and drum 19, mounted upon said shaft, a rope, 18, leading to said drum, a ratchet, 21, mounted upon the shaft 20, a pawl, 22, carried by the drum 19, a spring, 32, connected to the drum 19, the shaft 20, fixed drums 23 and 24, provided with ratchets 25, pawls 26, which engage said ratchets, ropes 27, connected to the drums 23 and 24, upwardly-extending bars 29, sheaves carried by said bars, over which the ropes 27 pass, braces 34, and a sheave, 31, all substantially as described.

WILLIAM B. DOLSEN.

Witnesses:
   G. T. ROTHWELL,
   S. B. MERRELL.